United States Patent

[11] 3,580,319

| [72] | Inventors | Werner Gorter<br>Baden;<br>Johann Hauser, Modling, Austria |
|---|---|---|
| [21] | Appl. No. | 815,387 |
| [22] | Filed | Apr. 11, 1969 |
| [45] | Patented | May 25, 1971 |
| [73] | Assignee | SEMPERIT Osterreichisch-Amerikanische Gammiwerke Aktiengesellschaft<br>Vienna, Austria |
| [32] | Priority | Apr. 18, 1968 |
| [33] | | Austria |
| [31] | | A3770/68 |

[54] PNEUMATIC TYRE
4 Claims, 3 Drawing Figs.

[52] U.S. Cl.................................................. 152/361
[51] Int. Cl.................................................. B60c 9/04
[50] Field of Search............................................ 152/361, 356, 354

[56] References Cited
UNITED STATES PATENTS

| 3,195,604 | 7/1965 | Boussu et al................. | 152/361 |
| 3,205,931 | 9/1965 | Keefe, Jr. .................... | 152/361 |

*Primary Examiner*—James B. Marbert
*Attorney*—Ernest F. Marmorek

ABSTRACT: A pneumatic tyre having reinforcements inserts of a maximum width of less than 95 percent (preferably 85—90 percent) or more than 105 percent of the tread with and in which the rubber sidewall on at least one side, and preferably both sides, is extended between the edge of the reinforcing inserts and the carcass to an extent of at least 10 percent of the maximum width of the inserts.

PATENTED MAY 25 1971  3,580,319

PNEUMATIC TYRE

The present invention relates to pneumatic tires for vehicles having reinforcing inserts between the carcass and the tread.

Hitherto, it has been considered that the optimum reinforcement effect is achieved when the width of the reinforcing inserts (binding width) corresponds essentially to the tread width. However, it has been found that when the binding width is equal to the tread width, or differs from this by not more than 5 percent, the binding edges lie in the region of a highly stressed and greatly deformed zone. Thus, separations of the edges and early failure of the tire often occur. By "tread width" is here meant the width of the tire which is in contact with the ground with normal loading and normal air pressure. Pneumatic tires for vehicles with reinforcing inserts are already known in which the width of the inserts is between 85 and 90 percent or 105 to 117 percent of the tread width. The above-mentioned disadvantages cannot thus be completely removed.

It is an object of the invention to provide a pneumatic tire for vehicles having reinforcing inserts in which the occurrence of deficiencies in the shoulder zone is avoided or reduced.

According to the invention, there is provided a pneumatic tire having reinforcing inserts between the tread surface and the carcass, wherein the maximum width of the reinforcing inserts is less than 95 percent or more than 105 percent of the tread width and wherein at least one of the rubber sidewalls is extended to a point between the edge of the reinforcing inserts and the carcass to an extent of at least 10 percent of the maximum width of the reinforcing inserts.

By means of this cushioning effect between the thin carcass and the preferably harder tread material in the shoulder zone, a damaging effect of the binding edge on the carcass is avoided. Advantageously, the reinforcing insert lying next to the carcass has a width of only 50 to 80 percent of the width of the remaining reinforcing inserts.

As regards the carcass, the side stability is increased, thread splitting in the curve of the tire and edge detachments are avoided. When driving on the road, an increased damping is achieved, which thus increases travelling comfort. As regards the binding, by the reduction of the width of this one reinforcing insert nearest the carcass, there results a favorable graduation at the shoulder, and the possibility of cushioning the insert edges without additional accumulation of material.

The invention will now be further described with reference to the drawings, in which.

Figure 1:
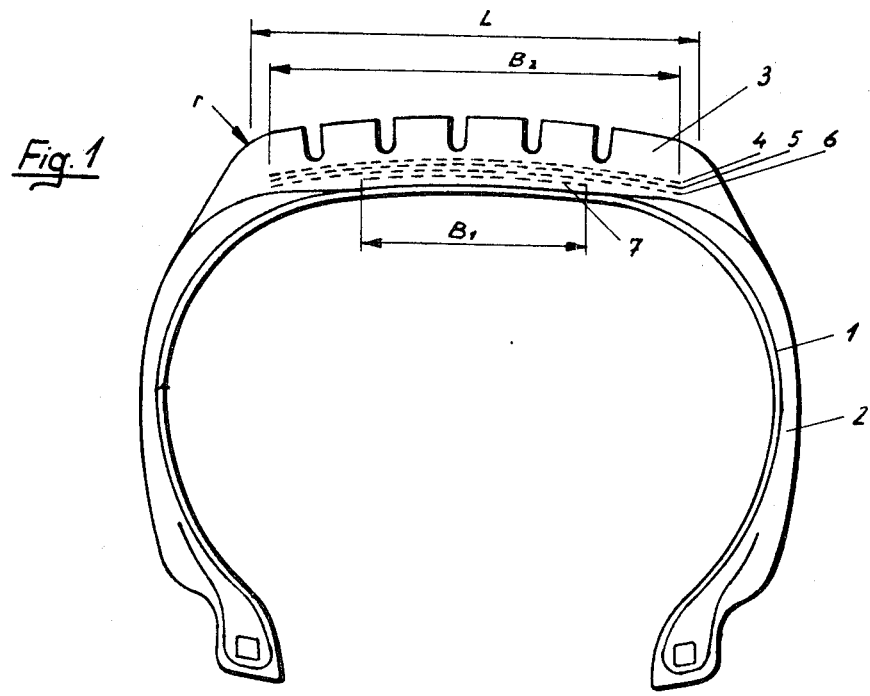
FIG. 1 is a schematic cross-sectional view of a pneumatic tire in accordance with the invention.

As shown in FIG. 1, sidewalls 2 of rubber are built on to a carcass 1 at the sides, and a tread 3 is applied on the middle section of the carcass, partially overlapping the sidewalls 2. The tread 3 is provided with reinforcing inserts 4, 5, 6 and 7.

The width $B_2$ of the reinforcing inserts 4, 5, and 6 is, in accordance with the invention, less than 95 percent (preferably 85 to 90 percent) of the tread width L. Alternatively, however, the width $B_2$ can be greater than 105 percent of the tread width. The width $B_1$ of the reinforcing insert 7 nearest the carcass 1 is 50 to 80 percent of the width $B_2$ of the reinforcing inserts 4, 5 and 6. The reinforcing insert 7 lies almost between the edges of the sidewalls 2. These sidewalls are, in accordance with the invention, extended to a point and tucked in such as between the edges of the reinforcing inserts and the carcass on either side to an extent of at least 10 percent of the width $B_2$ in each case. The edges of the tread have curved radii $r$, which are preferably 8 to 20 percent of the tread width. By the selection of this relatively small radius, the strength when cornering is increased. Moreover, a better and more controlled distribution of the load occurs.

Figure 2:
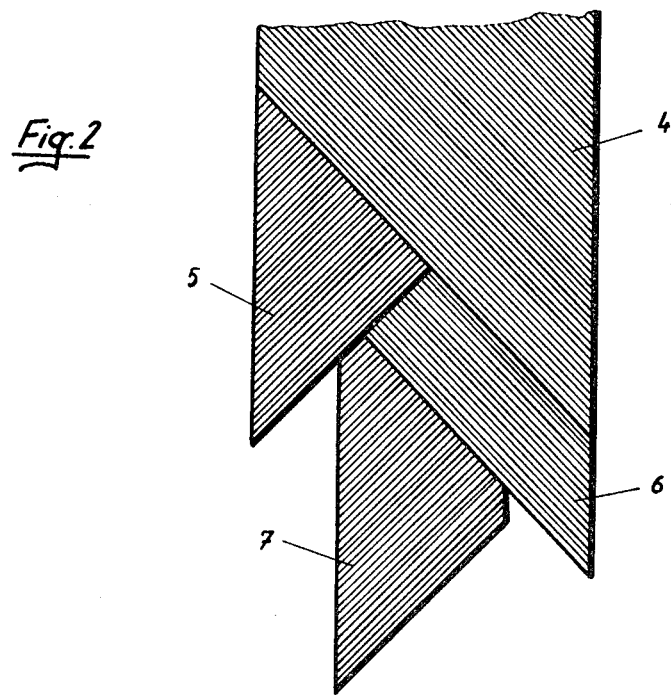
FIG. 2 is a plan view of part of the reinforcing inserts of the tire of FIG. 1.

The reinforcing inserts 4, 5, 6 and 7 lying one above the other are illustrated in FIG. 2. Here, the cord threads of the reinforcing inserts 4 and 6 run in one direction, and those of the reinforcing inserts 5 and 7 run in a direction at right-angles thereto.

Figure 3:
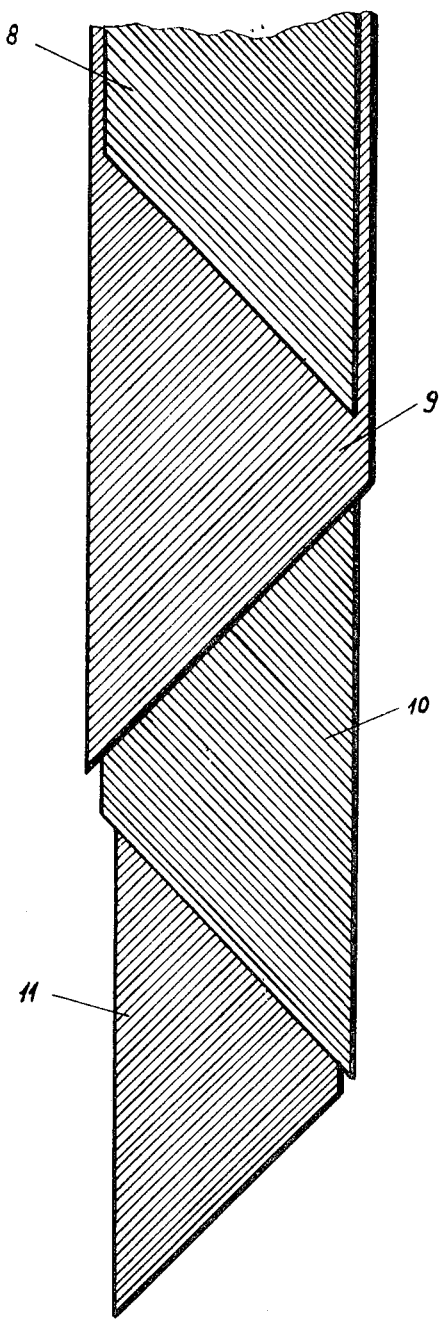
FIG. 3 is a plan view of part of an alternative form of reinforcing inserts.

In the selection of the position of the cord threads, the sum of the widths of the individual reinforcing inserts in which the cord threads run in one direction is preferably at least almost equal to the sum of the widths of the reinforcing inserts in which the cord threads run in the other direction. An embodiment in which this is the case is shown in FIG. 3. Here, the sum of the widths of reinforcing inserts 8 and 10, in which the cord threads run in one direction, is equal to the sum of the widths of reinforcing inserts 9 and 11, in which the cord threads runs in the other direction.

We claim:

1. A pneumatic tire having at least one rubber sidewall, a tread surface of a predetermined width, a carcass and a plurality of reinforcing layers therebetween, said reinforcing layers having a width less than 95 percent or more than 105 percent of the width of said tread surface, the improvement comprising:

said rubber sidewall extending to a point between said carcass and an edge of at least one of said reinforcing layers for a distance corresponding to at least 10 percent of the maximum width of said reinforcing layers.

2. A pneumatic tire as claimed in claim 1 wherein both the rubber sidewalls are extended between the respective edges of the reinforcing inserts and the carcass.

3. A pneumatic tire as claimed in claim 1 wherein the radius of curvature of the edges of the tread is between 8 and 20 percent of the tread width.

4. A pneumatic tire as claimed in claim 1 wherein the individual reinforcing inserts have at least three different widths and wherein the cord threads of the individual reinforcing inserts run alternately in mutually perpendicular directions, and wherein the sum of the widths of the individual reinforcing inserts on which the cord threads run in one direction is substantially equal to the sum of the widths of the individual reinforcing inserts in which the cord threads run in the other direction.